(12) United States Patent
Yang

(10) Patent No.: US 6,504,862 B1
(45) Date of Patent: Jan. 7, 2003

(54) METHOD AND APPARATUS FOR REDUCING THE RATIO OF PEAK TO AVERAGE POWER IN A GAUSSIAN SIGNAL INCLUDING A CDMA SIGNAL

(75) Inventor: Hong-Kui Yang, Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/324,046

(22) Filed: Jun. 2, 1999

(51) Int. Cl.⁷ .................................................. H04J 13/02
(52) U.S. Cl. ........................ 375/146; 375/297; 455/522; 455/127
(58) Field of Search ................................. 375/296, 297, 375/146, 349; 330/149; 455/126, 522

(56) References Cited

U.S. PATENT DOCUMENTS

| 5,742,595 A | 4/1998 | Bhagalia | 370/342 |
| 5,926,500 A * | 7/1999 | Odenwalder | 375/200 |
| 6,175,270 B1 * | 1/2001 | Vannucci | 330/2 |
| 6,242,975 B1 * | 6/2001 | Eidson et al. | 330/124 R |

FOREIGN PATENT DOCUMENTS

| EP | 0 751 630 A2 | 1/1997 | H04B/1/707 |
| GB | 2 315 379 A | 1/1998 | H04J/13/02 |

\* cited by examiner

*Primary Examiner*—Amanda T. Le

(57) ABSTRACT

A method and apparatus for reducing the peak power probability of a spread spectrum signal by clipping the signal to constrain its spectrum within error-shaped bounds. The method includes the steps of generating a clipping threshold signal, generating a clipping error signal responsive to both the clipping threshold signal and the spread spectrum signal, filtering the clipping error signal to produce a shaped error signal, and subtracting the shaped error signal from the spread spectrum signal.

12 Claims, 9 Drawing Sheets

METHOD AND APPARATUS FOR REDUCING THE RATIO OF PEAK TO AVERAGE POWER IN A GAUSSIAN SIGNAL INCLUDING A CDMA SIGNAL

BACKGROUND OF THE INVENTION

1. Field of the Invention

The present invention is directed to a method and apparatus for reducing the peak power probability of a band limited Gaussian signal by clipping the signal to constrain its spectrum within error-shaped bounds. More particularly, the invention is directed to reducing the peak to average power ratio in signals having a spread power distribution, including Code Division Multiple Access (CDMA) signals.

2. Description of Related Art

One of the more expensive components in a radio transmitter is a power amplifier. A power amplifier receives an input signal and in response generates a significantly more powerful output signal. The complex ratio between the power of the output signal and the power of the input signal is the amplifier's gain. Except for a magnitude gain in power, the output signal is desirably an accurate reproduction of the input signal, so that an information component in the input signal is accurately amplified in the output signal.

In practice, power amplifiers are highly non-linear devices and accurate amplification is achieved only when the instantaneous power of the input signal lies within a narrow domain. Whenever input signal power increases beyond the linear domain, the power amplifier generates a distorted output signal.

Two serious consequences flow from distorting the output signal. First, a noise component is introduced into the output signal and tends to obscure the information component, since the output signal is no longer an accurate amplification of the input signal. Second, the distortion generates spurious radio emissions both inside and outside the frequency band allocated to the radio transmitter, these spurious radio emissions interfering with radio transmissions from other transmitters. It is therefore desirable that a power amplifier be well matched to its input signal, such that the input signal instantaneous power remains within the narrow linear domain of the power amplifier.

To avoid distortion, one solution is to overspecify the power amplifier. One could use a power amplifier having a very large linear domain, one that could easily contain the average power level of the input signal and could even contain much higher input power peaks when they infrequently occurred. However, as previously mentioned, power amplifiers are expensive and it is therefore wasteful to overspecify this component.

Another solution is to pre-process the input signal to ensure that its peak power is always constrained within limits dictated by a smaller, cheaper power amplifier. In other words, the ratio of the input signal peak power to average power could be constrained to a certain limit. Unfortunately, such pre-processing is highly dependent upon the nature of the input signal.

One class of input signals that is particularly challenging to pre-process is Gaussian signals, which are characteristic of spread-spectrum communication signals, including code division multiple access (CDMA) signals. These signals have a substantially uniform average power distribution across a predetermined frequency range. It is therefore challenging to remove any portion of the signal without introducing distortion.

A conventional pre-processing technique includes sampling the input signal and then hard clipping all peak samples above a pre-defined threshold. The resulting clipped signal thus consists of both a desired signal and a clipping error signal. Since the error signal will smear outband emissions, a digital filter must be connected after the hard clipper to minimize the outband emissions. However, because this filter processes both the desired signal and the error signal it must satisfy both inband and outband requirements. The inband requirement is dictated by need to only minimally distort the desired signal, while the outband required is determined by the need to minimize spurious emissions. More particularly, the filter's inband frequency response is desirably as flat as possible. As a result of all these constraints, the filter is complicated to implement and has a high gate count.

To improve clipping performance according to the conventional technique, a higher sampling rate and consecutive multiple clipping are used. A higher sampling rate reduces the number of over-threshold peak samples that escape processing; however, not surprisingly, filter complexity increases with the sampling rate. Clipping a signal multiple times as it propagates through a radio transmitter resists post-clipping peak regrowth but also increases circuit complexity several fold.

What is needed therefore is a relatively simple yet effective method and apparatus for constraining the power peaks of a Gaussian signal.

SUMMARY OF THE INVENTION

The present invention is directed to such a solution, including a solution where a band limited Gaussian signal is received at a power amplifier for transmission. In particular, the Gaussian signal might be a composite of a set of code division multiple access (CDMA) signals in a multi-carrier mode or a wideband direct sequence CDMA signal.

At either the baseband or the intermediate frequency stage of the transmitter, embodiments of the invention reduce the probability of the peak to average power ratio of the signal. In contrast to the conventional technique, which includes hard clipping an input signal and then filtering the resulting clipped signal, the clipped signal including both the input signal and an error signal, embodiments of the present invention filter only the error signal. First the error signal is shaped with a shaping filter to reduce close-in outband emission, and then the shaped error signal is subtracted from the spread spectrum signal. After this error shaped clipping, a loose postprocessing filter, either lowpass or bandpass, is used to further reduce the far end spurious emission level. As a result, the probability of peak to average ratio is reduced and the outband spurious emission level is reduced to a required level due to the shaping filter and postprocessing filter. Since the shaping filter only applies to the error signal, the inband does not need to be flat. Therefore, the shaping filter is much simpler to implement than a filter according to the conventional technique.

Therefore, according to one aspect of the invention, there is provided a method of reducing the peak power probability of a spread spectrum signal, including clipping the signal to constrain its spectrum within error-shaped bounds. The method desirably includes generating a clipping threshold signal, generating a clipping error signal responsive to both the clipping threshold and the spread spectrum signal, filtering the clipping error signal to produce a shaped error signal; and subtracting the shaped error signal from the spread spectrum signal. This technique makes multiple clipping practical, which helps further reduce the probability of the peak occurrence.

Preferably, the method includes delaying the spread spectrum signal to align its phase with the shaped error signal for subtraction.

The step of receiving a spread spectrum signal might include receiving a baseband signal. In such case, it is desirable that filtering the clipping error signal includes lowpass filtering.

Generating the clipping error signal might include receiving a second instance of the baseband signal, receiving a third instance of the baseband signal, scaling the third instance of the baseband signal, and subtracting the scaled third instance of the baseband signal from the second instance of the baseband signal.

Preferably, scaling the third instance of the baseband signal includes receiving a fourth instance of the baseband signal, determining an RMS value of the fourth instance of the baseband signal, determining a peak value of the fourth instance of the baseband signal, dividing the RMS value by the peak value to produce a scaling factor, and multiplying the third instance of the baseband signal by the scaling factor.

In contrast, where receiving a spread spectrum signal includes receiving an intermediate frequency signal, it is desirable that filtering the clipping error signal includes bandpass filtering.

Generating the clipping error signal might thus include: receiving a second instance of the intermediate frequency signal, receiving a third instance of the intermediate frequency signal, amplitude clipping the third instance of the intermediate frequency signal, and subtracting the clipped third instance of the intermediate frequency signal from the second instance of the intermediate frequency signal.

Amplitude clipping the third instance of the intermediate frequency signal might include: receiving a fourth instance of the intermediate frequency signal, determining a current RMS value of the fourth instance of the intermediate frequency signal, multiplying the RMS value by a scaling factor to produce a scaled RMS value, setting a clipping threshold proportionate to the scaled RMS value, and clipping the third instance of the intermediate frequency signal when it exceeds the clipping threshold.

According to another aspect of the invention, there is provided an apparatus for reducing the peak power probability of a spread spectrum signal having an error-shaped clipper for constraining the spectrum within error-shaped bounds.

The error-shaped clipper might further include: a clipping threshold signal generator for generating a clipping threshold signal, a clipping error signal generator connected to generate a clipping error signal responsive to both the clipping threshold signal received from the clipping threshold signal generator and the spread spectrum signal, a filter connected to the clipping error signal generator to receive the clipping error signal and to produce in response a shaped error signal, and a first summing junction connected to subtract the shaped error signal from the spread spectrum signal.

The apparatus might further include a time-delay loop for delaying the spread spectrum signal to align its phase with the shaped error signal for subtraction.

Where the spread spectrum signal is a baseband signal, it is desirable that the filter for filtering the clipping error signal includes a lowpass filter.

Preferably, the clipping error signal generator includes: a first coupler for coupling a second instance of the baseband signal, a second coupler for coupling a third instance of the baseband signal, a divider connected to the second coupler to divide the third instance of the baseband signal, and a second summing junction connected to the first coupler and the divider to subtract the divided third instance of the baseband signal from the second instance of the baseband signal to produce the clipping error signal.

In this context, the word "coupler" does not denote a radio frequency coupler. In this context, the word "coupler" has its more general connotation as a device for transferring a signal, including a digital signal, from one portion of a circuit to another.

Desirably, the divider includes: a third coupler for coupling a fourth instance of the baseband signal; an RMS detector connected to the third coupler to generate an RMS signal responsive to the RMS value of the fourth instance of the baseband signal, a peak detector connected to the third coupler to generate a peak signal responsive to the peak value of the fourth instance of the baseband signal, a first multiplier connected to the RMS detector and the peak detector to divide the RMS signal by the peak signal to produce a scaling factor signal, and a second multiplier connected to the first multiplier and the second coupler to multiply the third instance of the baseband signal by the scaling factor signal.

In contrast, where the spread spectrum signal is an intermediate frequency signal, it is desirable that the filter for filtering the clipping error signal includes a bandpass filter.

Preferably, the clipping error signal generator includes: a first coupler for coupling a second instance of the intermediate frequency signal, a second coupler for coupling a third instance of the intermediate frequency signal, a clipper connected to the second coupler to amplitude clip the third instance of the intermediate frequency signal to produce a clipped third instance of the intermediate frequency signal, a second summing junction connected to the clipper and the first coupler to subtracting the clipped third instance of the intermediate frequency signal from the second instance of the intermediate frequency signal to produce the clipping error signal.

It is preferable that the clipper include: a third coupler for coupling a fourth instance of the intermediate frequency signal, an RMS detector connected to the third coupler to generate an RMS signal responsive to the RMS value of the fourth instance of the intermediate frequency signal, a terminal for receiving a user-adjustable scaling factor signal, a multiplier connected to the RMS detector and the terminal to multiply the RMS signal by the scaling factor signal to produce a scaled RMS signal, a variable amplitude hard-clipper connected to the multiplier and the second coupler to clip the amplitude of the third instance of the intermediate frequency signal back to a threshold level corresponding to the scaled RMS signal.

According to yet another aspect of the invention, there is provided a code division multiple access (CDMA) transmitter apparatus, having: a plurality of CDMA modems, each of the plurality of CDMA modems having a respective input and output, a digital pre-processing stage having a plurality of inputs, an output, at least one error-shaped clipper having an input and an output, at least one digital intermediate frequency (IF) processor having an input and an output, and a summing junction having a plurality of inputs and an output, each of the plurality of digital pre-processing stage inputs being connected to a respective CDMA modem output, and the plurality of digital pre-processing stage inputs being connected to the digital pre-processing stage output through the at least one error-shaped clipper, the at least one digital IF processor, and the summing junction, a digital to analog converter (DAC) having an input and an output, the DAC input being connected to the digital pre-processing stage output, an analog intermediate frequency and radio frequency (IF & RF) processor having an input and an output, the IF & RF processor input being connected to the DAC output, and a power amplifier having an input and an output, the power amplifier input being connected to the IF & RF processor output.

Desirably, the at least one error-shaped clipper includes a plurality of error-shaped clippers, each of the plurality of error-shaped clippers having an input connected to the output of a respective CDMA modem, the at least one digital IF processor includes a plurality of digital IF processors, each of the plurality of digital IF processors having an input connected to the output of a respective error-shaped clipper, and each of the plurality of inputs of the summing junction is connected to the output of a respective one of the plurality of digital IF processors.

Alternatively, each of the plurality of inputs of the summing junction is connected to the output of a respective one of the plurality CDMA modems, the input of the at least one error-shaped clipper is connected to the output of the summing junction, and the input of the at least one digital IF processor is connected to the output of the error-shaped clipper.

Still further alternatively, the at least digital IF processor includes a plurality of digital IF processors, each of the plurality of digital IF processors having an input connected to the output of a respective CDMA modem, each of the plurality of inputs of the summing junction is connected to the output of a respective one of the plurality of digital IF processors, and the input of the at least one error-shaped clipper is connected to the output of the summing junction.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
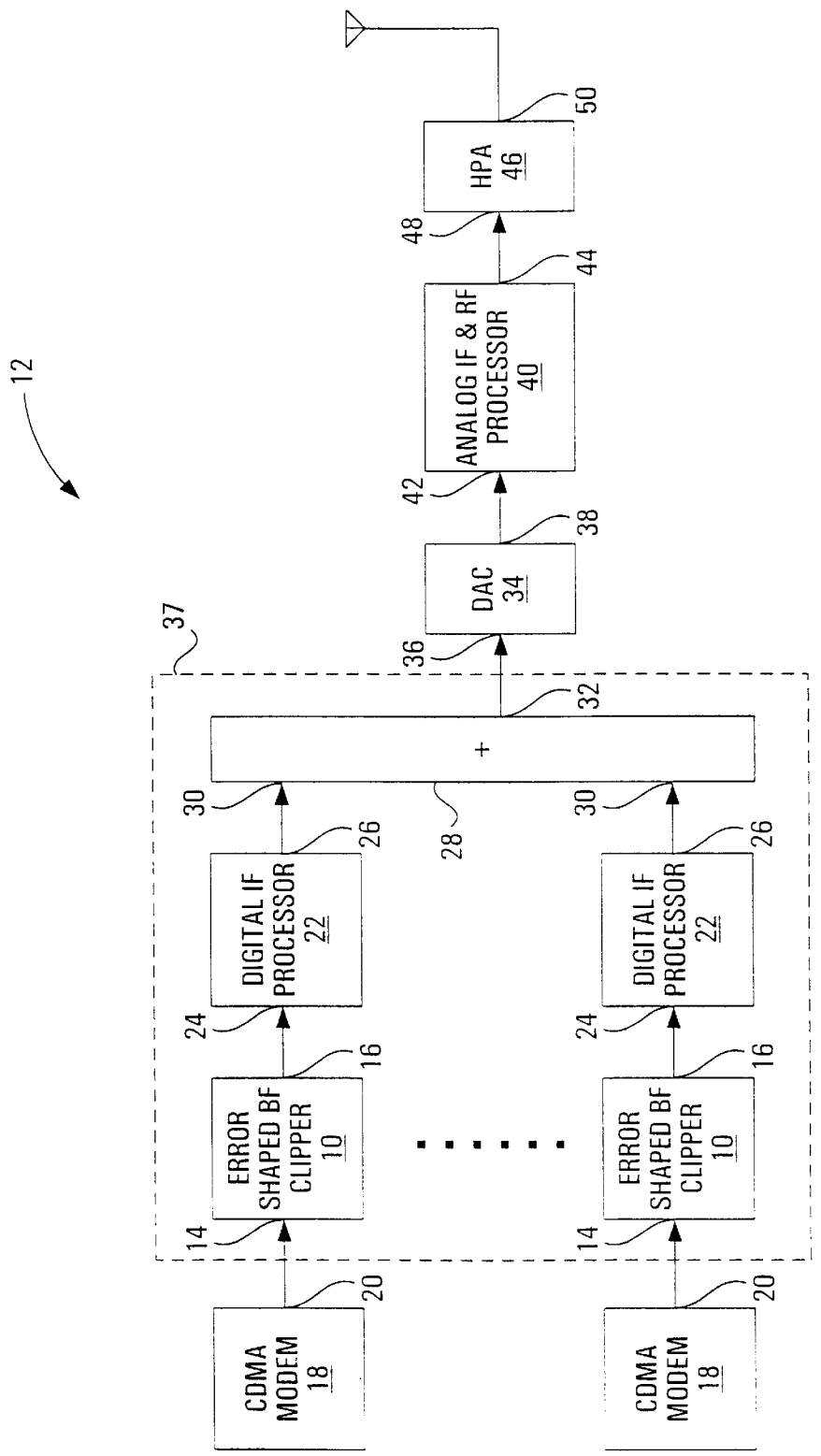
FIG. 1 is a block diagram illustrating a baseband clipping circuit according to a first embodiment of the present invention, forming a part of a radio transmitter.

FIG. 1 illustrates a plurality of baseband error-shaped clippers 10 according to a first embodiment of the invention, each connected as part of a larger radio transmitter in a multi-carrier mode, generally illustrated at 12. Each baseband error-shaped clipper 10 has an input terminal 14 and an output terminal 16.

The first stage of the radio transmitter 12 is a plurality of code division multiple access (CDMA) modems 18. Each modem 18 has an input terminal (not shown) for receiving signals for transmission and an output terminal 20. The output terminal 20 of each modem 18 is connected to the input terminal 14 of one of the respective baseband error shaped clippers 10.

The radio transmitter 12 further includes a plurality of digital intermediate frequency (IF) processors 22. Each IF processor 22 has an input terminal 24 and an output terminal 26. The input terminal 24 of each IF processor is connected to the output terminal 16 of one of the respective baseband error-shaped clippers 10.

The radio transmitter 12 further includes a summing junction 28 having a plurality of input terminals 30 and one output terminal 32. Each input terminal 30 of the summing junction 28 is connected to the output terminal 26 of one of the respective IF processors 22.

Together, the plurality of baseband error-shaped clippers 10, the plurality of IF processors 22, and the summing junction 28 form a digital pre-processing stage generally indicated at 37.

The radio transmitter 12 further includes a digital to analog converter (DAC) 34 having an input terminal 36 and an output terminal 38. The input terminal 36 of the DAC 34 is connected to the output terminal 32 of the summing junction 32.

The radio transmitter 12 further includes an analog intermediate frequency and radio frequency (IF & RF) processor 40 having an input terminal 42 and an output terminal 44. The input terminal 42 of the IF & RF processor 40 is connected to the output terminal 38 of the DAC 34.

The radio transmitter 12 further includes a high power amplifier 46 having an input terminal 48 and an output antenna 50. The input terminal 48 of the high power amplifier 46 is connected to the output terminal 44 of the IF & RF processor 40.

Thus it will be seen that in operation, a CDMA signal received at any modem 18 is clipped at the respective baseband error-shaped clipper 10 and then up-converted to a digital intermediate frequency signal by the respective digital IF processor 22. The intermediate frequency signals are then superimposed at the summing junction 28 and converted into a single analog signal by the digital to analog converter 34. Finally, the analog signal is up-converted to radio frequency at the IF & RF processor 40 before being transmitted through the antenna 50 by the high power amplifier 46.

Figure 2:
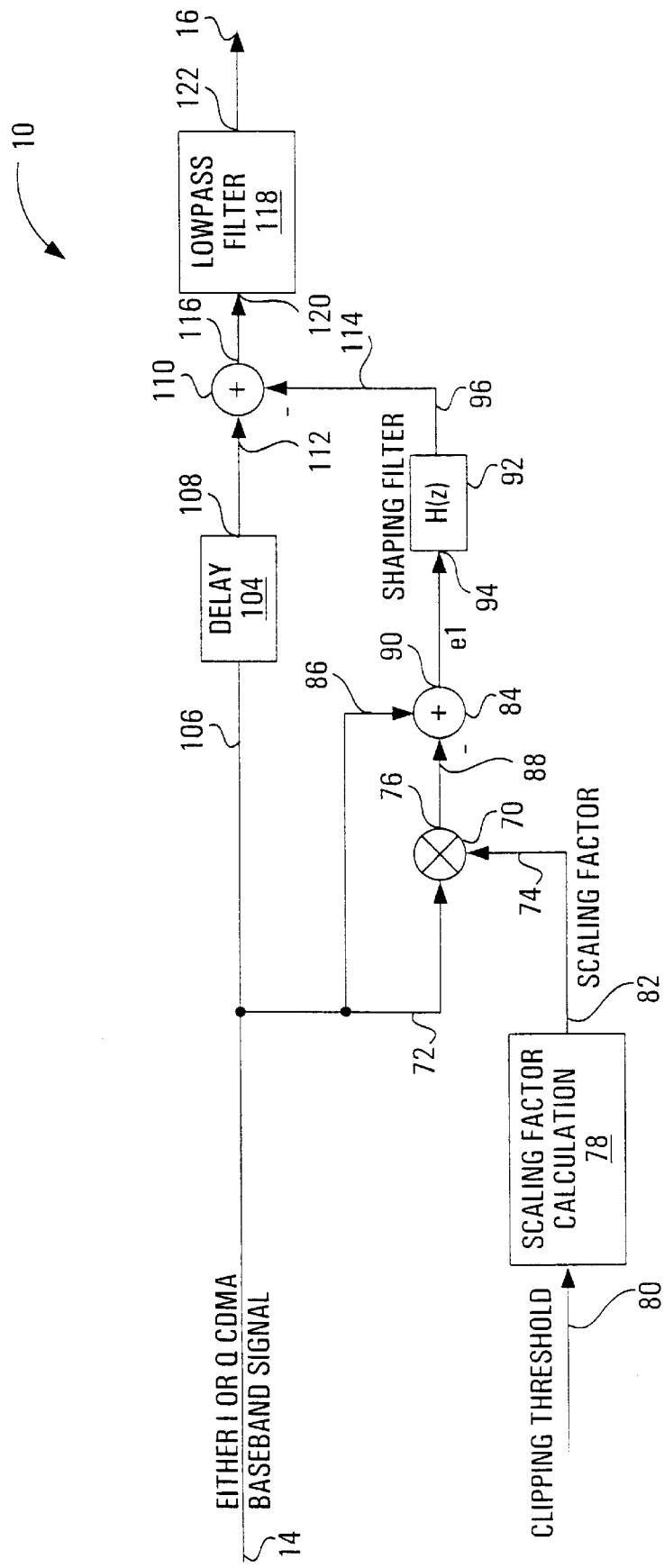
FIG. 2 is a block diagram detailing the baseband clipping circuit of FIG. 1, including a shaping filter and a scaling factor calculation circuit.

FIG. 2 illustrates the internal structure of the baseband error-shaped clipper 10.

The baseband error-shaped clipper 10 includes a signal multiplier 70 having first and second input terminals 72, 74 and an output terminal 76. The first input terminal 72 of the signal multiplier 70 is connected to the input terminal 14 of the baseband error-shaped clipper 10 to receive from the modem 18 a CDMA signal.

The baseband error-shaped clipper 10 further includes a scaling factor calculation circuit 78 having an input terminal 80 and an output terminal 82. The input terminal 80 of the scaling factor calculation circuit 78 is connected to receive a user-selectable voltage level for biasing the amount of error-shaped clipping to be applied. The output terminal 82 of the scaling factor calculation circuit 79 is connected to the input terminal 74 of the signal multiplier 70 to provide a scaling factor signal to the signal multiplier 70.

Thus the signal multiplier 70 is connected to produce at it output terminal 76 a scaled reproduction of the CDMA signal received at its first input terminal 72. In other words, the signal multiplier 70 functions as a divider.

The baseband error-shaped clipper 10 further includes a first summing junction 84 having a first input terminal 86, an inverting second input terminal 88 and an output terminal 90. The first input terminal 86 of the first summing junction 84 is connected to the input terminal 14 of the baseband error-shaped clipper 10 to receive from the modem 18 the CDMA signal. The second input terminal 88 of the summing junction 84 is connected to the output terminal 76 of the signal multiplier 70 to receive and invert the scaled CDMA signal.

Thus the first summing junction 84 is connected to produce at its output terminal 90 a clipping error signal equal to the difference between the CDMA signal and the scaled CDMA signal. In other words, the first summing junction 84 functions as a clipping error signal generator for generating a clipping error signal responsive to both a clipping threshold signal received from a clipping threshold signal generator and the spread spectrum CDMA signal.

The baseband error-shaped clipper 10 further includes a shaping filter 92 having an input terminal 94 and an output terminal 96. The input terminal 94 is connected to the output terminal 90 of the first summing junction 84 to receive the clipping error signal and thus the shaping filter 92 produces a shaped error signal at its output terminal 96.

Figure 3:
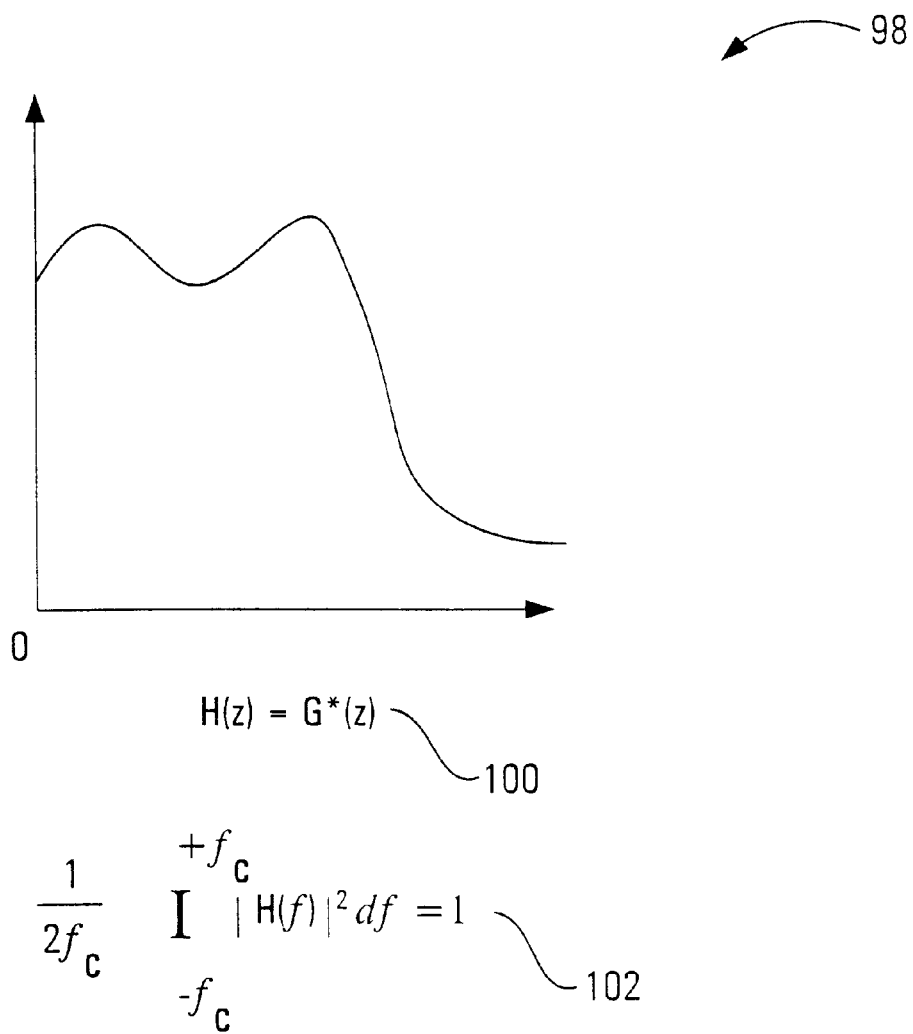
FIG. 3 is a graph of the frequency response of the shaping filter in the baseband clipping circuit of FIG. 2.

With reference briefly to FIG. 3, a preferred filtering amplitude response characteristic of the shaping filter 92 is illustrated generally at 98, the amplitude response characteristic 98 being described by first and second equations 100, 102, where: G(z) is a frequency response specified for the pulse shaping filter of the CDMA signal transmitter, $f_c$ is the cut-off frequency of the error shaping filter 92, and H(z) is the frequency response of the error shaping filter 92, including an equivalent frequency response due to the non-flat-top clipping noise.

With reference back to FIG. 2, the baseband error-shaped clipper 10 further includes a time-delay loop 104 having an input terminal 106 and an output terminal 108. The input terminal 106 of the time-delay loop 104 is connected to the input terminal 14 of the baseband error-shaped clipper 10 to receive from the modem 18 a CDMA signal. The time-delay loop 104 time-delays the received CDMA signal for a period of time equivalent to the propagation delay through the signal multiplier 70, the first summing junction 84, and the shaping filter 92 and provides the delayed CDMA signal at its output terminal 108.

The baseband error-shaped clipper 10 further includes a second summing junction 110 having a first input terminal 112, an inverting second input terminal 114 and an output terminal 116. The first input terminal 112 is connected to the output terminal 108 of the time-delay loop 104 to receive the delayed CDMA signal. The inverting second input terminal 114 is connected to the output of the shaping filter 96 to receive and invert the shaped error signal. The second summing junction 110 subtracts the shaped error signal from the delayed CDMA signal to produce at the output terminal 116 a difference signal.

The baseband error-shaped clipper 10 further includes a lowpass filter 118 having an input terminal 120 and an output terminal 122. The lowpass filter 118 is selected with regard to the particular far-end spurious emission requirements of the transmitter 12. The input terminal 120 is connected to the output terminal of the second summing junction 110 to receive the difference signal. The lowpass filter lowpass filters the difference signal to produce a filtered error-shaped clipped signal at its output terminal 122. The output terminal 122 of the lowpass filter 118 is the output terminal 16 of the baseband error-shaped clipper 10.

Figure 4:
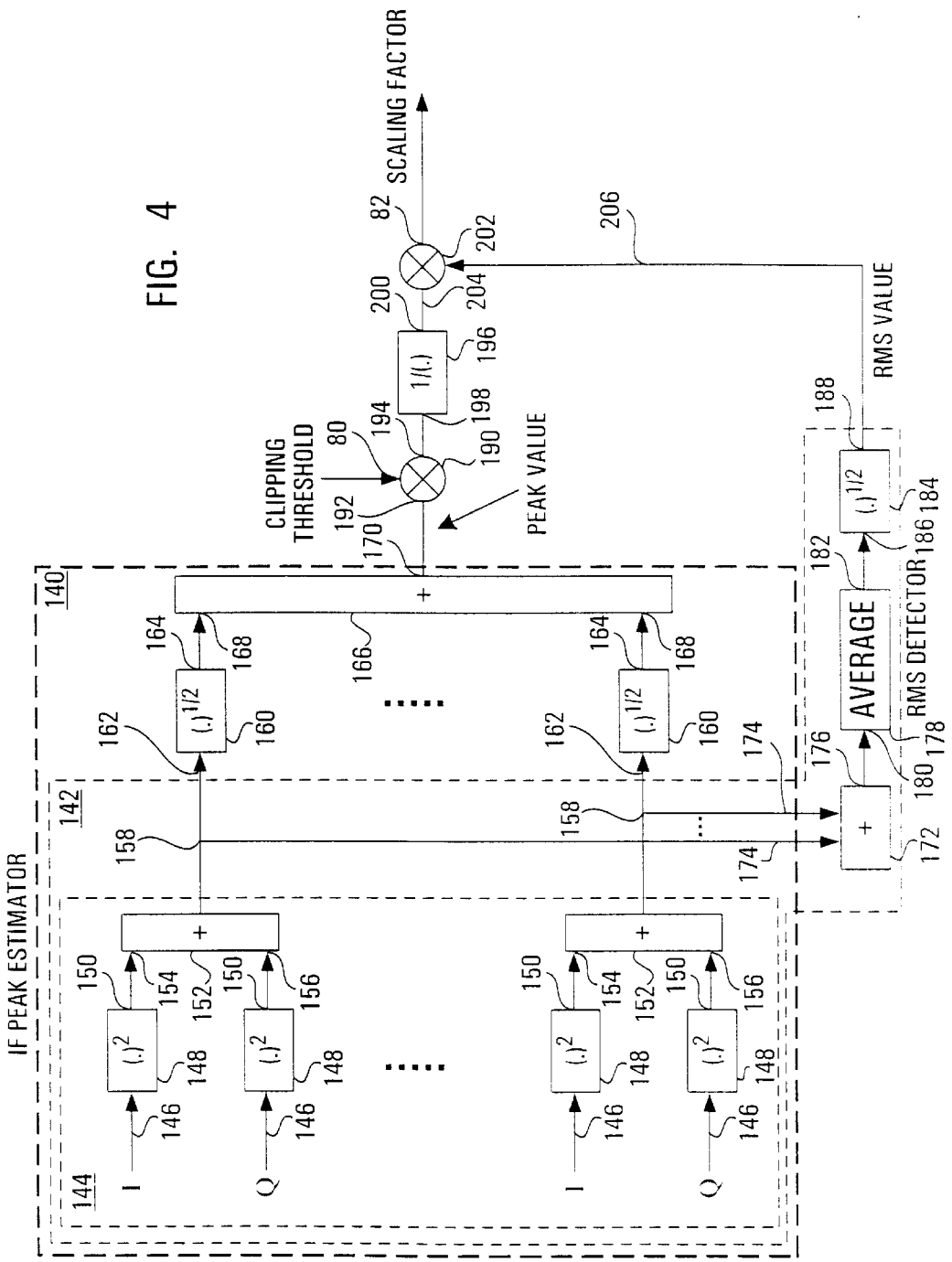
FIG. 4 is a block diagram of the scaling factor calculation circuit in the baseband clipping circuit of FIG. 2.

With reference now to FIG. 4, the architecture of the scaling factor calculation circuit 78 will now be discussed. As will be described below in more detail, the scaling factor calculation circuit 78 generates a signal estimate of the ratio of composite intermediate frequency peak power divided by composite intermediate frequency root-means-square (RMS) power, all multiplied by a user-selectable biasing factor. Thus, preferably this ratio is calculated over all received CDMA signals as opposed to just that CDMA signal received at a particular baseband error-shaped clipper 10.

The scaling factor calculation circuit 78 begins with an intermediate frequency (IF) peak estimator generally illustrated at 140 and an IF RMS detector generally illustrated at 142, the IF peak estimator 140 and the IF RMS detector 142 sharing an input stage generally illustrated at 144.

The input stage 144 includes a plurality of input terminals 146, one respectively for each I and Q component of each CDMA signal received at the scaling factor calculation circuit 78. The input stage further includes a plurality of signal squaring circuits 148, each connected to receive either the I or the Q component of a CDMA signal received at a respective input terminal 146. Each signal squaring circuit 148 has an output terminal 150 at which is produced a squared signal, which is the square of the signal received at the respective input terminal 146.

The input stage 144 further includes a plurality of summing junctions 152, each summing junction having first and second input terminals 154, 156 and an output terminal 158. The first input terminal 154 of each summing junction 152 is connected to the output terminal 150 of a respective signal squaring circuit 148, the signal squaring circuit 148 being connected to receive the I component of a CDMA signal. The second input terminal 156 of each summing junction 152 is connected to the output terminal 150 of a respective signal squaring circuit 148, the signal squaring circuit 148 being connected to receive the Q component of a CDMA signal. In this arrangement, each summing junction 152 is connected to sum the squared I and Q components of a particular CDMA signal received at the scaling factor calculation circuit 78. This CDMA squared-component sum signal is produced at the respective output terminal 158 of each summing junction 152.

The IF peak estimator 140 includes a plurality of signal square-rooting circuits 160, corresponding to each of the I and Q component pairs forming the CDMA signals received at the scaling factor calculation circuit 78. Each square-rooting circuit 160 has an input terminal 162 and an output terminal 164. The input terminal 162 of each square-rooting circuit 160 is connected to a respective output terminal 158 of an input stage 144 summing junction 152. The signal square-rooting circuits 160 each generate at their respective output terminals 164 a Pythagorean signal representing the magnitude of the CDMA code vector assembled from respective I and Q components.

A peak estimator summing junction 166 has a plurality of input terminals 168 and one output terminal 170. Each input terminal 168 is connected to the output terminal 164 of a respective signal square-rooting circuit 160 to receive the respective Pythagorean signal. The peak estimator summing junction 166 sums these Pythagorean signals to create an estimated peak signal of the combined CDMA signals received at the scaling factor calculation circuit 78. This peak signal, which is provided to the output terminal 170, errs on the high side by not accounting for phase cancellations.

The RMS detector 142 includes an RMS detector summing junction 172 having a plurality of input terminals 174 and a single output terminal 176. Each input terminal 174 is connected to the output terminal 158 of a respective input stage summing junction 152 to receive the respective CDMA squared-component sum signal. The RMS summing junction 172 sums these CDMA squared-component sum signals to create a composite squared sum signal, which is produced at its output terminal 176.

The RMS detector 142 further includes an averaging circuit 178 having an input terminal 180 and an output terminal 182. The input terminal 180 is connected to the output terminal of the RMS summing junction 172. The averaging circuit 178 produces a signal equivalent to the average of the received composite squared sum signal and produces that average signal at its output terminal 182.

The RMS detector 142 further includes an RMS square-rooting circuit 184 having an input terminal 186 and an output terminal 188. The input terminal 186 is connected to the output terminal 182 of the averaging circuit 178 to receive the average signal. The RMS square-rooting circuit 184 produces at its output terminal 188 an output signal equivalent to the square root of the average signal. This output signal is also a composite RMS signal corresponding to all the CDMA signals received at the scaling factor calculation circuit 78.

The scaling factor calculation circuit 78 further includes a first multiplier 190 having first and second input terminals 80, 192 and an output terminal 194. The first input terminal 80 is connected to receive the user-selectable biasing signal and the second input terminal 192 is connected to the output terminal 170 of the peak estimator summing junction 166 to receive the estimated peak value signal. The first multiplier 190 multiplies these two signals and produces a scaled peak signal at the output terminal 194.

The scaling factor calculation circuit 78 further includes a reciprocal circuit 196 having an input terminal 198 and an output terminal 200. The input terminal 198 is connected to the output terminal 194 of the first multiplier to receive the scaled peak signal. The reciprocal circuit 196 produces a reciprocal signal at its output terminal 200, which is the reciprocal of the scaled peak signal.

The scaling factor calculation circuit 78 further includes a second multiplier 202 having first and second input terminals 204, 206 and an output terminal 82. The first and second input terminals 204, 206 are respectively connected to the output terminals 200, 188 of the reciprocal circuit 196 and the RMS square-rooting circuit 184 for receiving the reciprocal of the scaled peak signal and the RMS signal. The second multiplier 202 multiplies the signals received at its first and second input terminals 204, 206 and produces in response at its output terminal 82 a scaling factor. Thus the scaling factor calculation circuit 78 functions as a clipping threshold signal generator for generating a clipping threshold signal.

Figure 1A:
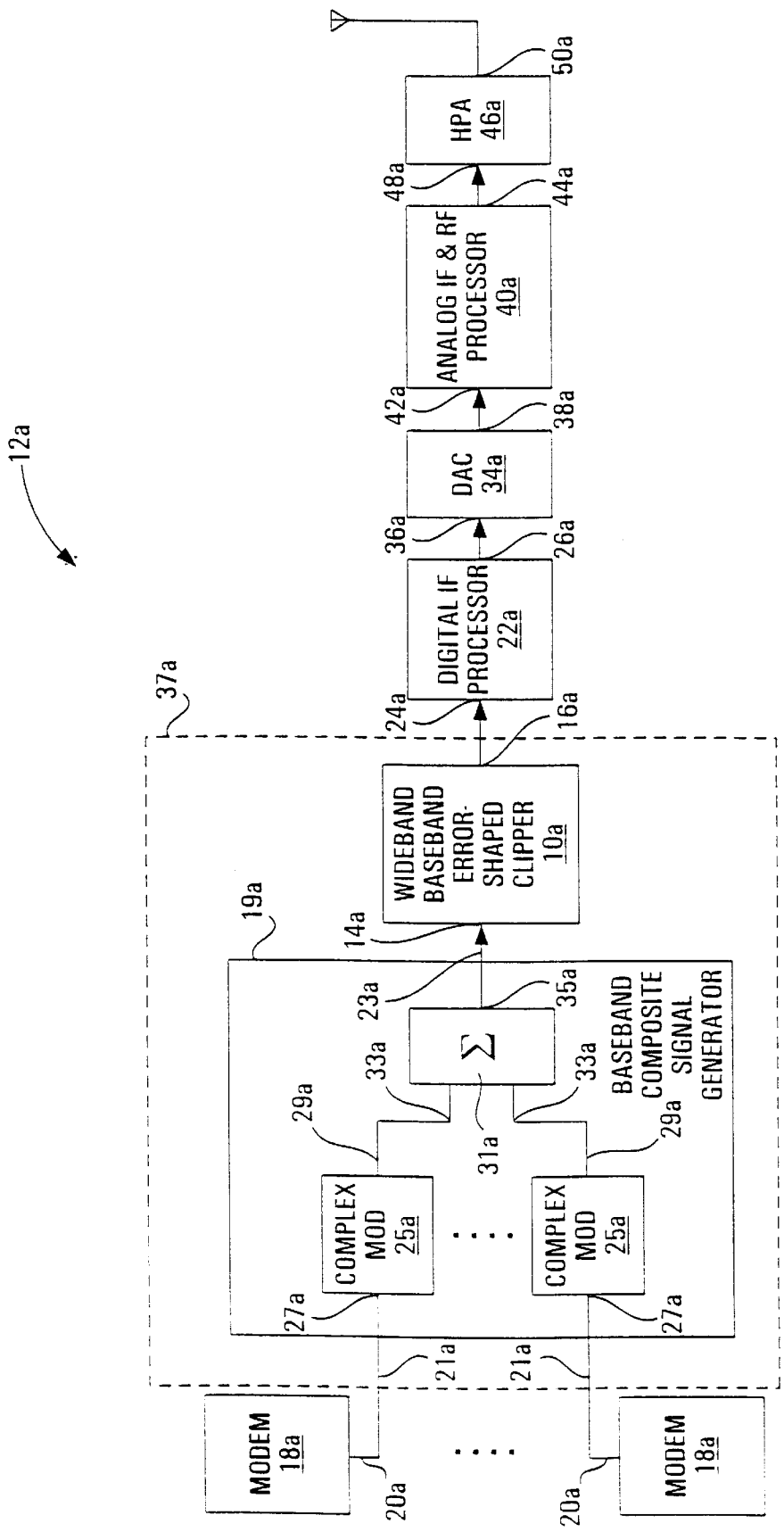
FIG. 1A is a block diagram illustrating a baseband clipping circuit according to a second embodiment of the present invention, forming a part of a radio transmitter.

While the embodiment of the radio transmitter 12 illustrated in FIG. 1 depicts a plurality of baseband error-shaped clippers 10, each respectively clipping one of the plurality of narrowband CDMA signals, an alternative exists. FIG. 1A illustrates a radio transmitter 12*a* according to an second embodiment of the invention, in which a single, composite wideband baseband CDMA signal is clipped.

In this second embodiment, there exists a baseband composite signal generator 19*a* for receiving a plurality of narrowband, baseband CDMA signals and producing in response a single composite wideband, baseband CDMA signal. The baseband composite signal generator 19*a* includes a plurality of inputs 21*a* and a single output 23*a*.

The plurality of CDMA modems 18*a* are connected in parallel to the baseband composite signal generator 19*a*, each of the plurality of modem outputs 20*a* being connected to one of the respective plurality of baseband composite signal generator inputs 21*a*.

The baseband composite signal generator output 23*a* is connected to the input 14*a* of a single wideband baseband error-shaped clipper 10*a*, to provide the error-shaped clipper 10*a* with the composite wideband baseband CDMA signal. The error-shaped clipper output 16*a* is connected to an input 24*a* of a single digital IF processor 22*a*. Thus in this second embodiment, only one baseband error-shaped clipper 10*a* and one digital IF processor 22*a* are required and no summing junction 28 is required.

The baseband composite signal generator 19*a* includes a plurality of complex modulators 25*a*, each with an input 27*a* and an output 29*a*. Each complex modulator input 27*a* is connected to a respective baseband composite signal generator input 21*a* to receive a narrowband, baseband CDMA signal from a respective one of the plurality of CDMA modems 20*a*.

The baseband composite signal generator 19*a* further includes a summing junction 31*a* having a plurality of inputs 33*a* and a single output 35*a*. Each of the plurality of summing junction inputs 33*a* is connected to an output 29*a* of a respective one of the plurality of complex modulators 25*a*. The single summing junction output 35*a* is connected to the baseband composite signal generator output 23*a*.

Together, the wideband baseband error-shaped clippers 10*a*, the IF processor 22*a*, and baseband composite signal generator 19*a*, with its summing junction 31 form a digital pre-processing stage generally indicated at 37*a*.

Figure 5:
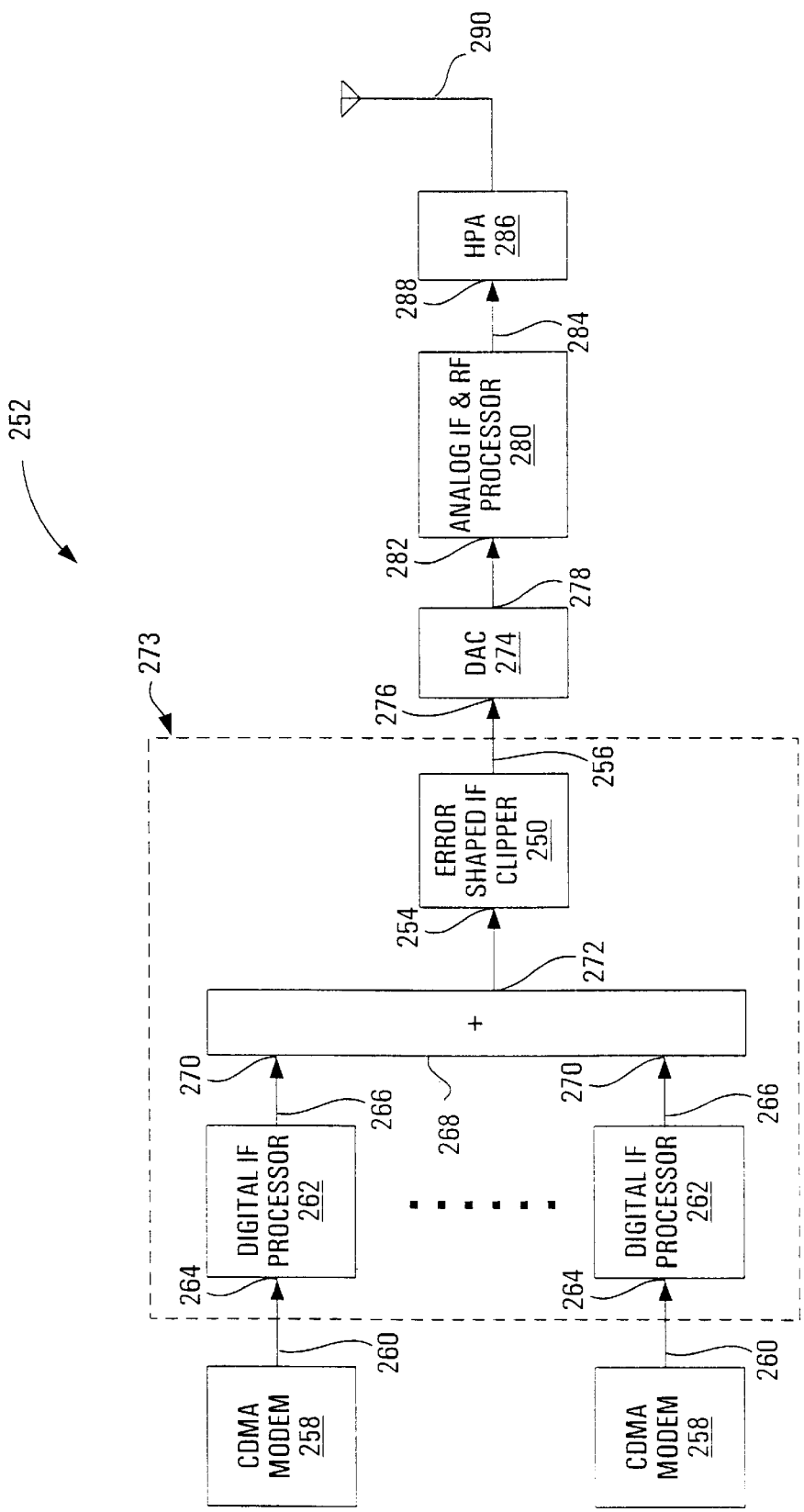
FIG. 5 is a block diagram illustrating an intermediate frequency clipping circuit according to a third embodiment of the present invention, forming a part of a radio transmitter.

FIG. 5 illustrates an intermediate frequency error-shaped clipper 250 according to a third embodiment of the present invention, connected as part of a larger radio transmitter, generally illustrated at 252. The intermediate frequency error-shaped clipper 250 has an input terminal 254 and an output terminal 256.

The first stage of the radio transmitter 252 is a plurality of code division multiple access (CDMA) modems 258. Each modem 18 has an input terminal (not shown) for receiving modulated signals for transmission and an output terminal 260 for providing demodulated digital signals to the radio transmitter 252.

The radio transmitter 252 further includes a plurality of digital intermediate frequency (IF) processors 262. Each IF processor 262 has an input terminal 264 and an output terminal 266. The input terminal 264 of each IF processor is connected to the output terminal 260 of one of the respective modems 258.

The radio transmitter 252 further includes a summing junction 268 having a plurality of input terminals 270 and one output terminal 272. Each input terminal 270 of the summing junction 268 is connected to the output terminal 266 of one of the respective IF processors 262. The output terminal 272 of the summing junction 268 is in turn connected to the input terminal 254 of the intermediate frequency error-shaped clipper 250.

Together, the intermediate frequency error-shaped clipper 250, the plurality of IF processors 262, and summing junction 268 form a digital pre-processing stage generally indicated at 273.

The radio transmitter 252 further includes a digital to analog converter (DAC) 274 having an input terminal 276 and an output terminal 278. The input terminal 276 of the DAC 274 is connected to the output terminal 256 of the intermediate frequency error-shaped clipper 250.

The radio transmitter 252 further includes an analog intermediate frequency and radio frequency (IF & RF) processor 280 having an input terminal 282 and an output terminal 284. The input terminal 282 of the IF & RF processor 280 is connected to the output terminal 278 of the DAC 274.

The radio transmitter 252 further includes a high power amplifier 286 having an input terminal 288 and an output antenna 290. The input terminal 288 of the high power amplifier 286 is connected to the output terminal 284 of the IF & RF processor 280.

Thus it will be seen that in operation, a CDMA signal received at any modem 258 is up-converted to an intermediate frequency signal by the respective digital IF processor 262 and all of the intermediate frequency signals are then superimposed at the summing junction 268. The summed signal is clipped at the intermediate frequency error-shaped clipper 250 and then converted into a single analog signal by the digital to analog converter 274. Finally, the analog signal is further up-converted to radio frequency at the IF & RF processor 280 before being transmitted through the antenna 290 by the high power amplifier 286.

Figure 6:
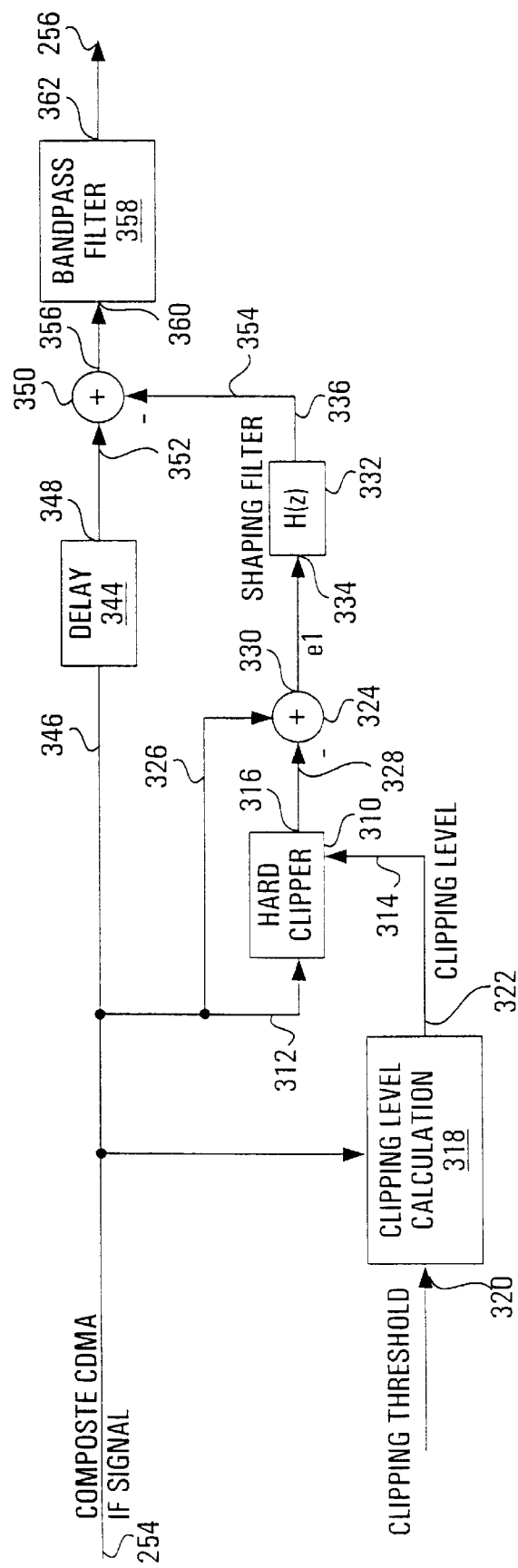
FIG. 6 is a block diagram detailing the intermediate frequency clipping circuit of FIG. 5, including a shaping filter and a clipping level calculation circuit.

FIG. 6 illustrates the internal structure of the intermediate frequency error-shaped clipper 250.

The intermediate frequency error-shaped clipper 250 includes a hard clipper 310 having first and second input terminals 312, 314 and an output terminal 316. The first input terminal 312 of the hard clipper 310 is connected to the input terminal 254 of the intermediate frequency error-shaped clipper 250 to receive from the modem 258 a CDMA signal.

The intermediate frequency error-shaped clipper 250 further includes a clipping threshold calculation circuit 318 having an input terminal 320 and an output terminal 322. The input terminal 320 of the clipping threshold calculation circuit 318 is connected to receive a user-selectable voltage level for biasing the amount of error-shaped clipping to be applied. The output terminal 322 of the clipping threshold calculation circuit 79 is connected to the second input terminal 314 of the hard clipper 310 to provide a clipping threshold signal to the hard clipper 70, the clipping threshold signal establishing the amplitude threshold at which the hard clipper 310 clips a signal received at its first input terminal 312.

Thus the hard clipper 310 is connected to produce at it output terminal 316 an amplitude clipped reproduction of the CDMA signal received at its first input terminal 312.

The intermediate frequency error-shaped clipper 250 further includes a first summing junction 324 having a first input terminal 326, an inverting second input terminal 328 and an output terminal 330. The first input terminal 326 of the first summing junction 324 is connected to the input terminal 254 of the intermediate frequency error-shaped clipper 250 to receive from the modem 258 the CDMA signal. The second input terminal 328 of the summing junction 324 is connected to the output terminal 316 of the hard clipper 310 to receive and invert the amplitude clipped CDMA signal.

Thus the first summing junction 324 is connected to produce at its output terminal 330 a clipping error signal equal to the difference between the CDMA signal and the amplitude clipped CDMA signal.

The intermediate frequency error-shaped clipper 250 further includes a shaping filter 332 having an input terminal 334 and an output terminal 336. The input terminal 334 is connected to the output terminal 330 of the first summing junction 324 to receive the clipping error signal and thus the shaping filter 332 produces a shaped error signal at its output terminal 336.

Figure 7:
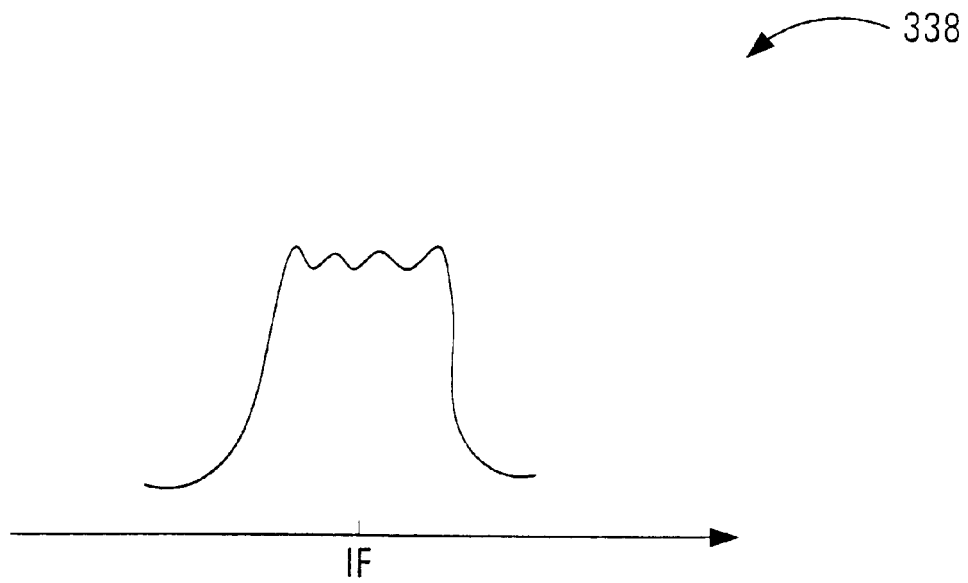
FIG. 7 is a graph of the frequency response of the shaping filter in the intermediate frequency clipping circuit of FIG. 6.

With reference briefly to FIG. 7, a preferred filtering amplitude response characteristic of the shaping filter 332 is illustrated generally at 338, the amplitude response characteristic 338 being described by first and second equations 340, 342 where: G(z) is the frequency response specified for the pulse shaping filter of the CDMA signal transmitter at IF frequency, $f_0$ is the intermediate frequency carrier frequency, $f_c$ is the cut-off frequency of the shaping filter 332, and H(z) is the frequency response of the error shaping filter 332, including an equivalent frequency response due to the non-flat-top clipping noise.

With reference back to FIG. 6, the intermediate frequency error-shaped clipper 250 further includes a time-delay loop 344 having an input terminal 346 and an output terminal 348. The input terminal 346 of the time-delay loop 344 is connected to the input terminal 254 of the intermediate frequency error-shaped clipper 250 to receive from the modem 258 a CDMA signal. The time-delay loop 344 time-delays the received CDMA signal for a period of time equivalent to the propagation delay through the hard clipper 310, the first summing junction 324, and the shaping filter 332, and provides the delayed CDMA signal at its output terminal 348.

The intermediate frequency error-shaped clipper 250 further includes a second summing junction 350 having a first input terminal 352, an inverting second input terminal 354 and an output terminal 356. The first input terminal 352 is connected to the output terminal 348 of the time-delay loop 344 to receive the delayed CDMA signal. The inverting second input terminal 354 is connected to the output of the shaping filter 336 to receive and invert the shaped difference signal. The second summing junction 350 subtracts the shaped error signal from the delayed CDMA signal to produce at the output terminal 356 a difference signal.

The intermediate frequency error-shaped clipper 250 further includes a bandpass filter 358 having an input terminal 360 and an output terminal 362. The input terminal 360 is connected to the output terminal 356 of the second summing junction 350 to receive the difference signal. The bandpass filter 358 bandpass filters the second difference signal to produce a filtered error-shaped clipped signal at its output terminal 362. The output terminal 362 of the bandpass filter 358 is the output terminal 256 of the intermediate frequency error-shaped clipper 250.

Figure 8:
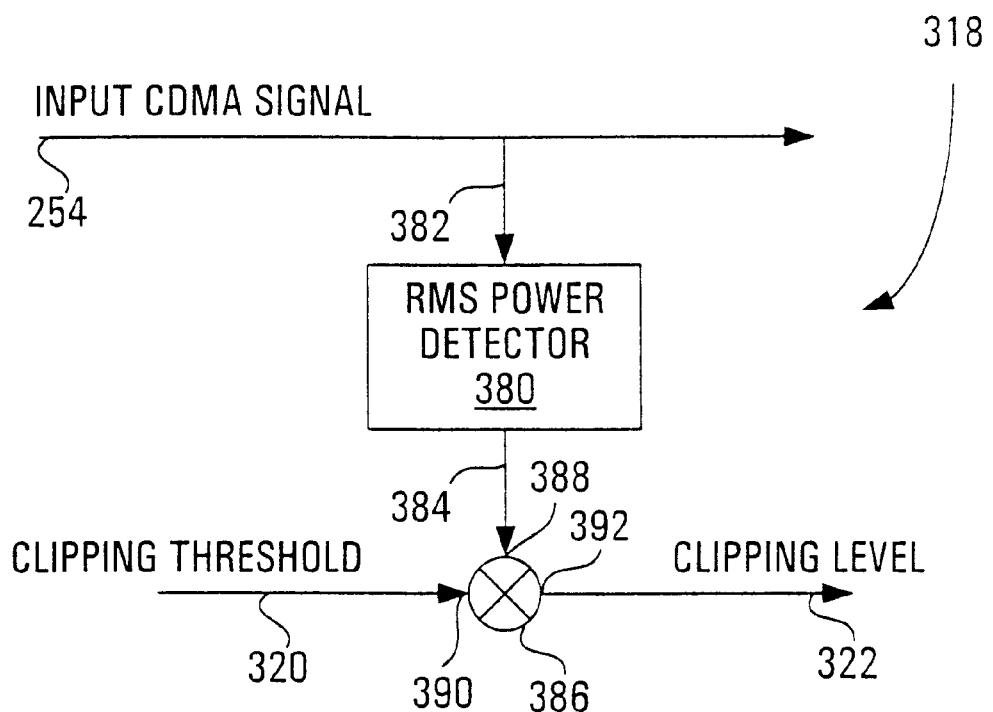
FIG. 8 is a block diagram of the clipping level calculation circuit in the intermediate frequency clipping circuit of FIG. 6.

With reference now to FIG. 8, the architecture of the clipping threshold calculation circuit 318 will now be discussed. As will be described below in more detail, the clipping threshold calculation circuit 318 generates a signal representing the root-means-square (RMS) power of the composite CDMA signal multiplied by a user-selectable biasing factor. Unlike the first embodiment, the peak power signal is already present in the intermediate frequency composite CDMA signal and therefore doesn't have to be estimated.

The clipping threshold calculation circuit 318 includes an RMS power detector 380 having an input terminal 382 and an output terminal 384. The input terminal 382 is connected to the input terminal 254 of the intermediate frequency error-shaped clipper 250 to receive from the modem 258 a CDMA signal. The RMS power detector 380 provides at its output terminal 384 a signal representing the RMS power of the signal received at its input terminal 382.

The clipping threshold calculation circuit 318 further includes a multiplier 386 having first and second input terminals 388, 390 and an output terminal 392. The first and second input terminals 388, 390 are respectively connected to the output terminal 384 of the RMS power detector 380 and the input terminal 320 of the clipping threshold calculation circuit 318 to receive the user-selectable voltage level for biasing the amount of error-shaped clipping to be applied. The multiplier 386 multiplies the signals at its first and second input terminals 388, 390 to produce at its output terminal 392 a scaled RMS power signal. The multiplier 386 output terminal 392 is connected to the clipping threshold calculation circuit 318 output terminal 322, so that the scaled RMS power signal functions as the clipping threshold signal.

While specific embodiments of the invention have been described and illustrated, such embodiments should be considered illustrative of the invention only and not as limiting the invention as construed in accordance with the accompanying claims.

What is claimed is:

1. A method of reducing the peak power probability of a spread spectrum baseband signal comprising clipping a first instance of the spread spectrum baseband signal to constrain it within error-shaped bounds by:
   a) generating a clipping threshold signal;
   b) generating a clipping error signal responsive to both the clipping threshold signal and the first instance of the spread spectrum baseband signal by:
      i) receiving a second instance of the baseband signal;
      ii) receiving a third instance of the baseband signal;
      iii) scaling the third instance of the baseband signal; and
      iv) subtracting the scaled third instance of the baseband signal from the second instance of the baseband signal;
   c) low pass filtering the clipping error signal to produce a shaped error signal;
   d) subtracting the shaped error signal from the first instance of the spread spectrum baseband signal; and
   e) delaying the first instance of the spread spectrum baseband signal to align its phase with the shaped error signal.

2. A method as claimed in claim 1 wherein scaling the third instance of the baseband signal includes:
   a) receiving a fourth instance of the baseband signal;
   b) determining an RMS value of the fourth instance of the baseband signal;
   c) determining a peak value of the fourth instance of the baseband signal;
   d) dividing the RMS value by the peak value to produce a scaling factor; and
   e) multiplying the third instance of the baseband signal by the scaling factor.

3. A method of reducing the peak power probability of a spread spectrum intermediate frequency signal comprising clipping a first instance of the speed spectrum intermediate frequency signal to constrain it within error-shaped bounds by:
   a) generating a clipping threshold signal;
   b) generating a clipping error signal responsive to both the clipping threshold signal and the first instance of the spread spectrum intermediate frequency signal by:
      i) receiving a second instance of the intermediate frequency signal;
      ii) receiving a third instance of the intermediate frequency signal;
      iii) scaling the third instance of the intermediate frequency signal; and
      iv) subtracting the scaled third instance of the intermediate frequency signal from the second instance of the intermediate frequency signal;
   c) low pass filtering the clipping error signal to produce a shaped error signal;
   d) subtracting the shaped error signal from the first instance of the spread spectrum intermediate frequency signal; and
   e) delaying the first instance of the spread spectrum intermediate frequency signal to align its phase with the shaped error signal.

4. A method as claimed in claim 3 wherein filtering the clipping error signal includes bandpass filtering.

5. A method as claimed in claim 4 wherein generating the clipping error signal includes:
   a) receiving a second instance of the intermediate frequency signal;
   b) receiving a third instance of the intermediate frequency signal;
   c) amplitude clipping the third instance of the intermediate frequency signal; and
   d) subtracting the clipped third instance of the intermediate frequency signal from the second instance of the intermediate frequency signal.

6. A method as claimed in claim 5 wherein amplitude clipping the third instance of the intermediate frequency signal includes:
   a) receiving a fourth instance of the intermediate frequency signal;
   b) determining an RMS value of the fourth instance of the intermediate frequency signal;
   c) multiplying the RMS value by a scaling factor to produce a scaled RMS value;
   d) setting a clipping threshold proportionate to the scaled RMS value; and
   e) clipping the third instance of the intermediate frequency signal when it exceeds the clipping threshold.

7. An apparatus for reducing the peak power probability of a spread spectrum baseband signal comprising an error-shaped clipper for constraining a first instance of the spread spectrum baseband signal within error-shaped bounds, said error-shaped clipper comprising:
   a) a clipping threshold signal generator for generating a clipping threshold signal;

b) a clipping error signal generator for generating a clipping error signal responsive to both the clipping threshold signal received from the clipping threshold signal generator and the first instance of the baseband signal, said clipping error signal generator comprising:
  i) a first coupler for coupling a second instance of the baseband signal;
  ii) a second coupler for coupling a third instance of the baseband signal;
  iii) a divider connected to the second coupler to divide the third instance of the baseband signal; and
  iv) a second summing junction connected to the first coupler and the divider to subtract the divided third instance of the baseband signal from the second instance of the baseband signal to produce the clipping error signal;
c) a low pass filter connected to the clipping error signal generator to receive the clipping error signal and to produce in response a shaped error signal;
d) a first summing junction connected to subtract the shaped error signal from the first instance of the baseband signal; and
e) a time-delay loop for delaying the first instance of the baseband signal to align its phase with the shaped error signal for subtraction.

8. An apparatus as claimed in claim 7 wherein the divider includes
  a) a third coupler for coupling a fourth instance of the baseband signal;
  b) an RMS detector connected to the third coupler to generate an RMS signal responsive to the RMS value of the fourth instance of the baseband signal;
  c) a peak detector connected to the third coupler to generate a peak signal responsive to the peak value of the fourth instance of the baseband signal;
  d) a first multiplier connected to the RMS detector and the peak detector to divide the RMS signal by the peak signal to produce a scaling factor signal; and
  e) a second multiplier connected to the first multiplier and the second coupler to multiply the third instance of the baseband signal by the scaling factor signal.

9. An apparatus for reducing the peak power probability of a spread spectrum intermediate frequency signal comprising an error-shaped clipper for constraining a first instance of the spread spectrum intermediate frequency signal within the error-shaped bounds, said error-shaped clipper comprising:
  a) a clipping threshold signal generator for generating a clipping threshold signal;
  b) a clipping error signal generator for generating a clipping error signal responsive to both the clipping threshold signal received from the clipping threshold signal generator and the first instance of the intermediate frequency signal, said clipping error signal generator comprising;
    i) a first coupler for coupling a second instance of the intermediate frequency signal;
    ii) a second coupler for coupling a third instance of the intermediate frequency signal;
    iii) a divider connected to the second coupler to divide the third instance of the intermediate frequency signal; and
    iv) a second summing junction connected to the first coupler and the divider to subtract the divided third instance of the intermediate frequency signal from the second instance of the intermediate frequency signal to produce the clipping error signal;
  c) a low pass filter connected to the clipping error signal generator to receive the clipping error signal and to produce in response a shaped error signal;
  d) a first summing junction connected to subtract the shaped error signal from the first instance of the intermediate frequency signal; and
  e) a time-delay loop for delaying the first instance of the intermediate frequency signal to align its phase with the shaped error signal for subtraction.

10. An apparatus as claimed in claim 9 wherein the filter for filtering the clipping error signal includes a bandpass filter.

11. An apparatus as claimed in claim 10 wherein the clipping error signal generator includes:
  a) a first coupler for coupling a second instance of the intermediate frequency signal;
  b) a second coupler for coupling a third instance of the intermediate frequency signal;
  c) a clipper connected to the second coupler to amplitude clip the third instance of the intermediate frequency signal to produce a clipped third instance of the intermediate frequency signal;
  d) a second summing junction connected to the clipper and the first coupler to subtract the clipped third instance of the intermediate frequency signal from the second instance of the intermediate frequency signal to produce the clipping error signal.

12. An apparatus as claimed in claim 11 wherein the clipper includes:
  a) a third coupler for coupling a fourth instance of the intermediate frequency signal;
  b) an RMS detector connected to the third coupler to generate an RMS signal responsive to the RMS value of the fourth instance of the intermediate frequency signal;
  c) a terminal for receiving a user-adjustable scaling factor signal;
  d) a multiplier connected to the RMS detector and the terminal to multiply the RMS signal by the scaling factor signal to produce a scaled RMS signal; p1 e) a variable amplitude hard-clipper connected to the multiplier and the second coupler to clip the amplitude of the third instance of the intermediate frequency signal back to a threshold level corresponding to the scaled RMS signal.

* * * * *

UNITED STATES PATENT AND TRADEMARK OFFICE
CERTIFICATE OF CORRECTION

PATENT NO.    : 6,504,862 B1
DATED         : January 7, 2003
INVENTOR(S)   : Hong-Kui Yang It is certified that error appears in the above-identified patent and that said Letters Patent is hereby corrected as shown below:

<u>Column 16,</u>
Line 50, delete subparagraphs d) and e) and substitute
-- d) a multiplier connected to the RMS detector and the terminal to multiply the RMS signal by the scaling factor signal to produce a scaled RMS signal;

e) a varible amplitude hard-clipper connected to the multiplier and the second coupler to clip the apmplitude of the third instance of the intermediate frequency signal back to a threshold level corresponding to the scaled RMS signal. --

Signed and Sealed this

Seventh Day of October, 2003

JAMES E. ROGAN
*Director of the United States Patent and Trademark Office*